(12) United States Patent
Kamio (10) Patent No.: US 10,948,078 B2
(45) Date of Patent: Mar. 16, 2021

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 16/292,582

(22) Filed: Mar. 5, 2019

(65) Prior Publication Data

US 2019/0195354 A1 Jun. 27, 2019

Related U.S. Application Data

(63) Continuation of application No. PCT/JP2017/032327, filed on Sep. 7, 2017.

(30) Foreign Application Priority Data

Sep. 9, 2016 (JP) .............................. JP2016-176277

(51) Int. Cl.
| | |
|---|---|
| *F16H 61/12* | (2010.01) |
| *F16H 61/28* | (2006.01) |
| *F16H 61/02* | (2006.01) |
| *F16H 61/32* | (2006.01) |

(52) U.S. Cl.
CPC .............. *F16H 61/12* (2013.01); *F16H 61/02* (2013.01); *F16H 61/28* (2013.01); *F16H 61/32* (2013.01); *F16H 2061/1268* (2013.01); *F16H 2061/326* (2013.01)

(58) Field of Classification Search
CPC .. F16H 61/02; F16H 61/12; F16H 2061/1208; F16H 2061/122; F16H 2061/1224; F16H 2061/126; F16H 2061/1268; F16H 2061/1288; F16H 2312/20

See application file for complete search history.

(56) References Cited

U.S. PATENT DOCUMENTS

| | | | | |
|---|---|---|---|---|
| 5,094,115 A | * | 3/1992 | Michihira .............. | B60K 37/06 74/335 |
| 6,382,041 B1 | * | 5/2002 | Burgbacher ............ | F16H 61/12 74/335 |
| 2005/0174084 A1 | | 8/2005 | Nakai et al. | |
| 2011/0046859 A1 | * | 2/2011 | Beyse ..................... | F16H 61/12 701/51 |

(Continued)

FOREIGN PATENT DOCUMENTS

| | | |
|---|---|---|
| JP | 3-28901 | 2/1991 |
| JP | 5-17743 | 3/1993 |

(Continued)

*Primary Examiner* — Edwin A Young
(74) *Attorney, Agent, or Firm* — Nixon & Vanderhye P.C.

(57) ABSTRACT

A shift range control device switches a shift range by controlling driving of an actuator. A plurality of control units are configured to control the driving of the actuator. A plurality of monitoring control units are correspondingly provided for the plurality of control units, and configured to monitor the corresponding control units. The driving of the actuator is controlled by one of the control units, which is in a normal state. When an abnormality occurs in the one of the control units being used to control the driving of the actuator, the one is switched to another one of the control units to control the driving of the actuator.

4 Claims, 5 Drawing Sheets

(56) References Cited

U.S. PATENT DOCUMENTS

2015/0142283 A1* 5/2015 Ono .................. F16H 61/32
  701/60
2017/0349207 A1 12/2017 Maeshima
2018/0202544 A1* 7/2018 Okubo ................ G05B 9/03

FOREIGN PATENT DOCUMENTS

| JP | 6-69518 | 9/1994 |
| JP | 2006-142869 | 6/2006 |
| JP | 2006-335157 | 12/2006 |
| JP | 2008-262426 | 10/2008 |
| WO | 2017/179337 | 10/2017 |

* cited by examiner

SHIFT RANGE CONTROL DEVICE

CROSS REFERENCE TO RELATED APPLICATIONS

The present application is a continuation application of International Patent Application No. PCT/JP2017/032327 filed on Sep. 7, 2017, which designated the U.S. and claims the benefit of priority from Japanese Patent Application No. 2016-176277 filed on Sep. 9, 2016. The entire disclosures of all of the above applications are incorporated herein by reference.

TECHNICAL FIELD

The present disclosure relates to a shift range control device.

BACKGROUND

It has been known a shift range switching device that switches a shift range by controlling a motor in accordance with a shift range switching request given from a driver. For example, a switched reluctance motor is used as a drive source of a shift range switching mechanism. The switched reluctance motor is hereinafter referred to as "SR motor".

SUMMARY

The present disclosure provides a shift range control device including a plurality of control units each configured to control driving of a motor for switching a shift range of a vehicle.

BRIEF DESCRIPTION OF DRAWINGS

The above and other objects, features and advantages of the present disclosure will become more apparent from the following detailed description made with reference to the accompanying drawings, in which.

DETAILED DESCRIPTION

In a conventionally known shift range control device, for example, driving of a motor for switching a shift range of a vehicle is controlled by a single ECU. In such a case, if the ECU has an abnormality, there is a fear that the motor is not driven and a shift range is not switched.

According to an aspect of the present disclosure, a shift range control device for switching a shift range by controlling driving of an actuator includes a plurality of control units and a plurality of monitoring units.

The control units are each configured to control the driving of the actuator. The monitoring units are correspondingly provided for the control units, and each monitors an abnormality of a corresponding control unit.

The driving of the actuator is controlled by one of the control units, the one being in a normal state. In a case where an abnormality occurs in the control unit that is being used for controlling the driving of the actuator, the control unit is switched to another one of the control units to control the driving of the actuator.

In such a configuration, since the shift range control device includes the plurality of control units, the control of the driving of the actuator can be continued when at least one control unit is in a normal state, and thus the switching control of the shift range can be continued. As such, even if an abnormality occurs in any of the control units, an evacuation travelling performance can be ensured.

If one actuator is controlled using a plurality of control units, an efficiency of the actuator may be deteriorated due to deviation of output timings of commands from the control units. In the present disclosure, however, one control unit is used for controlling the driving of the actuator at a time, the efficiency of the actuator will not be deteriorated and the actuator can be appropriately controlled.

Hereinafter, embodiments of the present disclosure will be described with reference to the drawings.

First Embodiment

Figure 1:
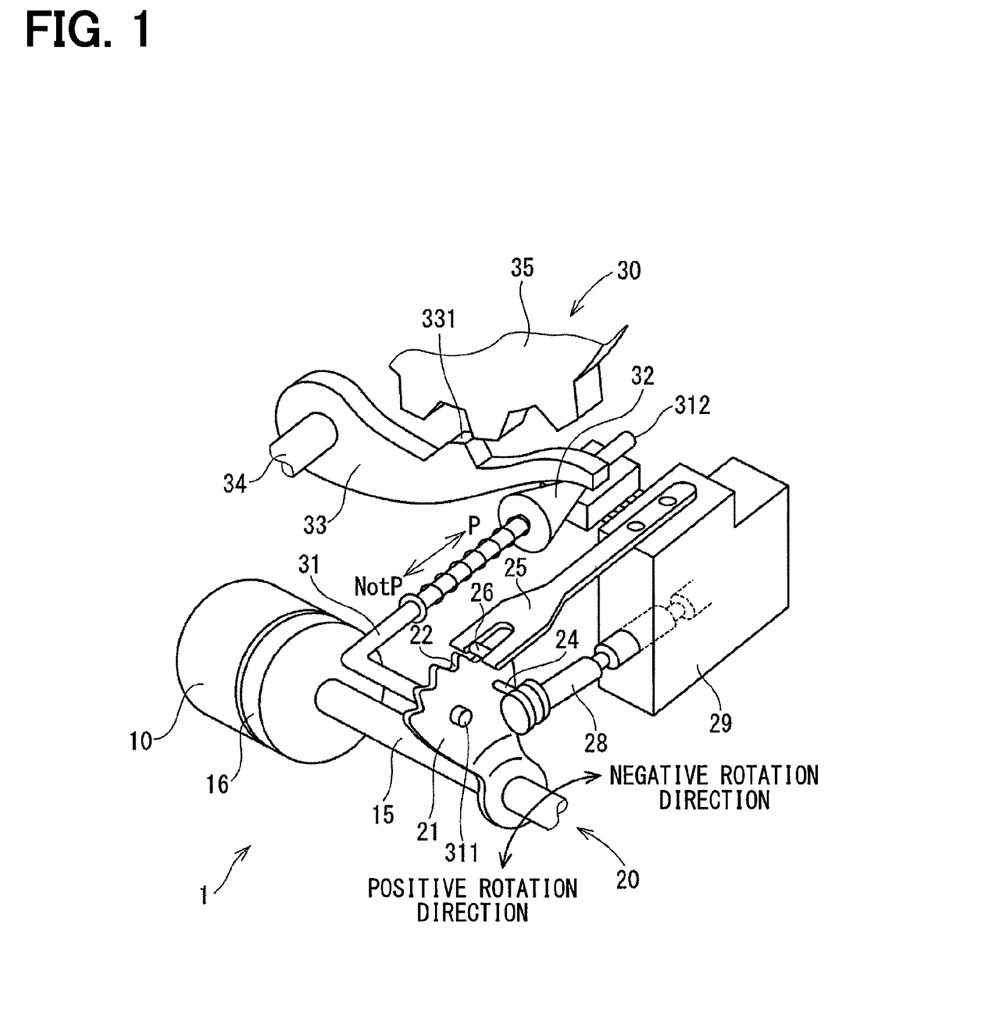
FIG. 1 is a perspective view showing a shift-by-wire system according to a first embodiment.
Figure 2:
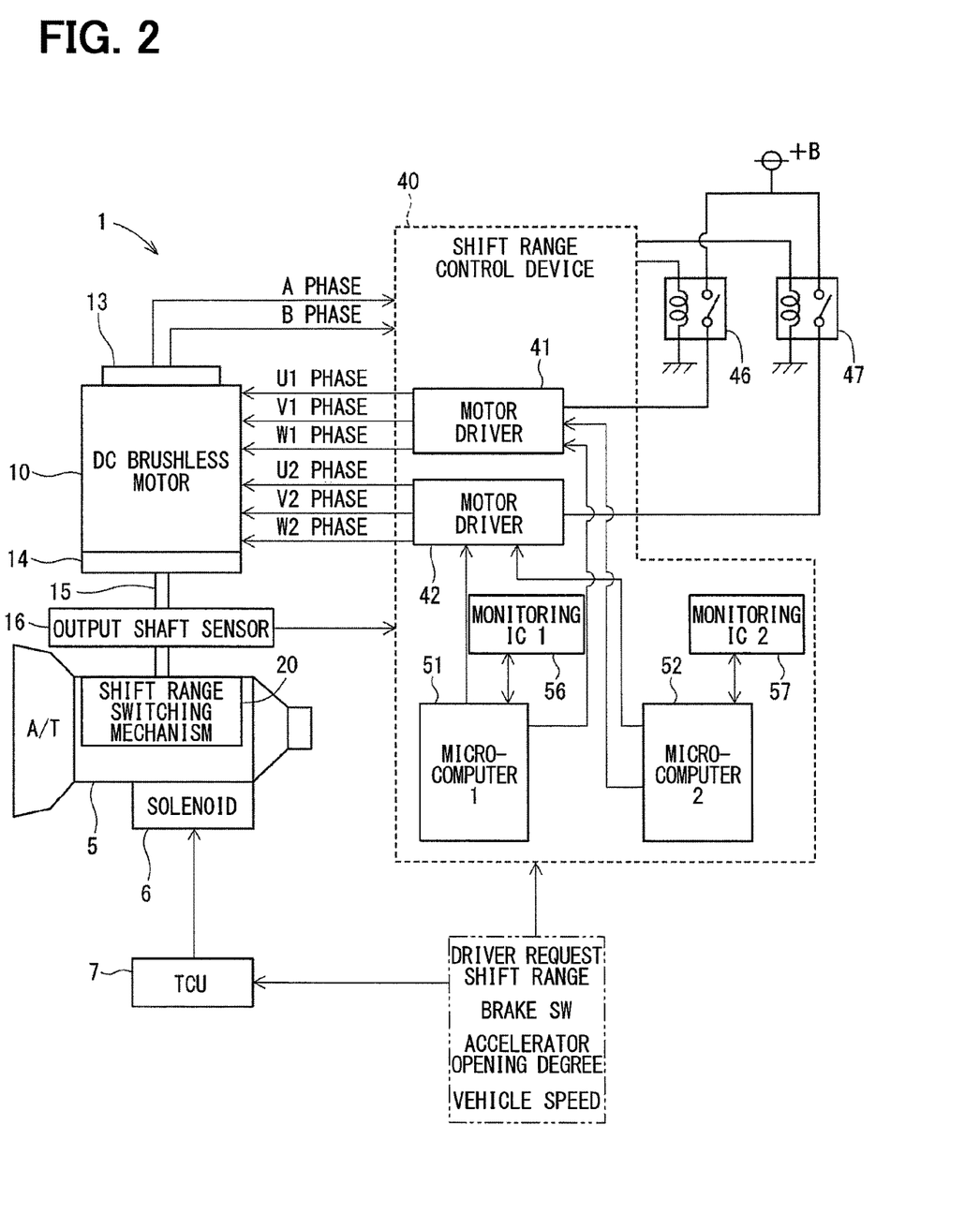
FIG. 2 is a schematic configuration diagram showing the shift-by-wire system according to the first embodiment.

As shown in FIGS. 1 and 2, a shift-by-wire system 1 includes a motor 10 as an actuator, a shift range switching mechanism 20, a parking lock mechanism 30, a shift range control device 40, and others.

Figure 3:
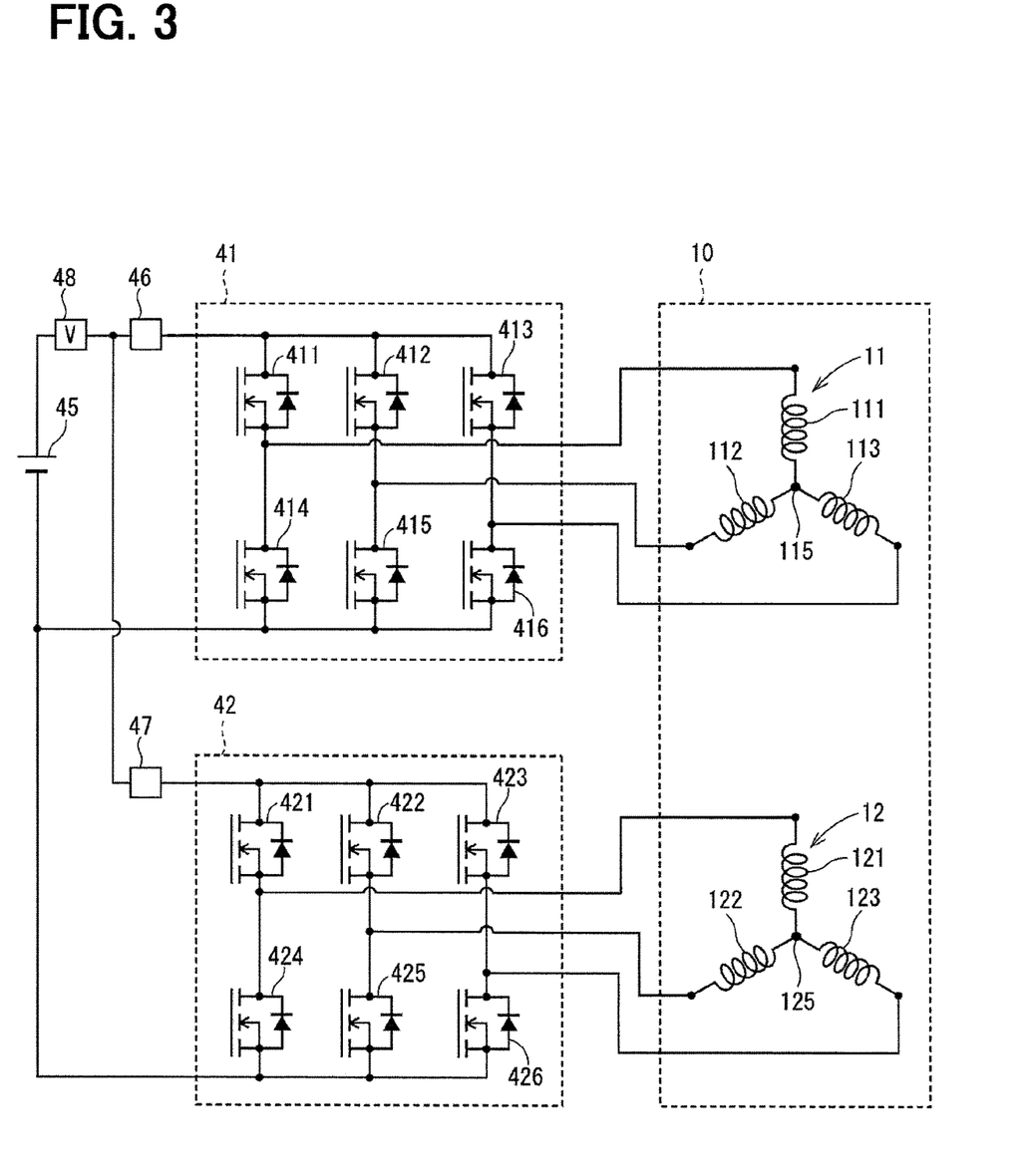
FIG. 3 is a circuit diagram showing a motor and a motor driver according to the first embodiment.

The motor 10 rotates when receiving electric power from a battery 45 (see FIG. 3) mounted on a not-shown vehicle to function as a drive source of the shift range switching mechanism 20. The motor 10 is capable of changing the value of current by feedback control, and capable of changing a command for each phase. The motor 10 of the present embodiment is a permanent magnet DC brushless motor. As shown in FIG. 3, the motor 10 includes two pairs of winding sets 11 and 12. The first winding set 11 has a U1 coil 111, a V1 coil 112, and a W1 coil 113. The second winding set 12 has a U2 coil 121, a V2 coil 122, and a W2 coil 123.

As shown in FIG. 2, an encoder 13 detects a rotational position of a not-shown rotor of the motor 10. For example, the encoder 13 is a magnetic rotary encoder, and is constituted by a magnet which rotates with the rotor as one body, a Hall integrated circuit (IC) for magnetism detection, and others. The encoder 13 outputs pulse signals of A phase and B phase at predetermined angular intervals in synchronization with rotation of the rotor.

A speed reducer 14 is provided between a motor shaft and an output shaft 15 of the motor 10 to reduce a rotation speed of the motor 10 and output the rotation to the output shaft 15. In this manner, the rotation of the motor 10 is transmitted to the shift range switching mechanism 20. An output shaft sensor 16 for detecting an angle of the output shaft 15 is provided on the output shaft 15. For example, the output shaft sensor 16 is a potentiometer.

As shown in FIG. 1, the shift range switching mechanism 20 includes a detent plate 21, a detent spring 25, and others. The shift range switching mechanism 20 transmits a rotational driving force output from the speed reducer 14 to a manual valve 28 and the parking lock mechanism 30.

The detent plate 21 is fixed to the output shaft 15 and driven by the motor 10. In the present embodiment, a direction in which the detent plate 21 moves away from a base portion of the detent spring 25 is defined as a positive rotation direction, and a direction in which the detent plate 21 moves toward the base portion is defined as a negative rotation direction.

The detent plate 21 includes a pin 24 projecting in parallel with the output shaft 15. The pin 24 is connected to the manual valve 28. When the detent plate 21 is driven by the motor 10, the manual valve 28 reciprocates in an axial direction. More specifically, the shift range switching mechanism 20 converts rotational movement of the motor 10 into linear movement, and transmits the linear movement to the manual valve 28. The manual valve 28 is included in a valve body 29. When the manual valve 28 reciprocates in the axial direction, a hydraulic pressure supply path to a not-shown hydraulic clutch is switched to change an engagement state of the hydraulic clutch. In this manner, switching of a shift range is achieved.

Four recesses 22 each for holding the manual valve 28 in a position corresponding to an associated range are formed in a region of the detent plate 21 adjacent to the detent spring 25. The recesses 22 are formed in correspondence with ranges of D, N, R, and P from the base portion side of the detent spring 25, respectively.

The detent spring 25 is an elastically deformable plate-shaped member. A detent roller 26 is provided at a tip of the detent spring 25. The detent roller 26 fits to one of the recesses 22.

The detent spring 25 urges the detent roller 26 toward the rotation center of the detent plate 21. When a rotational force equal to or larger than a predetermined force is applied to the detent plate 21, the detent spring 25 is elastically deformed. As a result, the detent roller 26 moves along the recesses 22. When the detent roller 26 is fitted to any of the recesses 22, swing of the detent plate 21 is regulated. Accordingly, the axial position of the manual valve 28 and the state of the parking lock mechanism 30 are determined to fix a shift range of an automatic transmission 5.

The parking lock mechanism 30 includes a parking rod 31, a cone 32, a parking lock pole 33, a shaft portion 34, and a parking gear 35.

The parking rod 31 has a substantially L shape. One end 311 of the parking rod 31 is fixed to the detent plate 21. The cone 32 is provided at an opposite end 312 of the parking rod 31. The cone 32 has a diameter which decreases toward the opposite end 312. When the detent plate 21 swings in the negative rotation direction, the cone 32 moves in a direction of an arrow P.

The parking lock pole 33 abuts a conical surface of the cone 32 and swings around the shaft portion 34. The parking lock pole 33 includes a protrusion 331 engageable with the parking gear 35 and located at a position adjacent to the parking gear 35. When the cone 32 moves in the direction of the arrow P by rotation of the detent plate 21 in the negative rotation direction, the parking lock pole 33 is pushed up to achieve engagement between the protrusion 331 and the parking gear 35. On the other hand, when the cone 32 moves in a direction of an arrow Not-P by rotation of the detent plate 21 in the positive rotation direction, the engagement between the protrusion 331 and the parking gear 35 is released.

The parking gear 35 is provided on a not-shown axle in such a manner as to be engageable with the protrusion 331 of the parking lock pole 33. Rotations of the axle are regulated during engagement between the parking gear 35 and the protrusion 331. At the time of a shift range other than P range, i.e., non-P range, the parking gear 35 is not locked by the parking lock pole 33. In this condition, rotations of the axle are not regulated by the parking lock mechanism 30.

During the shift range of P range, the parking gear 35 is locked by the parking lock pole 33. In this condition, rotations of the axle are regulated.

As shown in FIGS. 2 and 3, the shift range control device 40 includes motor drivers 41 and 42, microcomputer 51 and 52 as control units, monitoring ICs 56 and 57 as monitoring units, and others.

As shown in FIG. 3, the motor driver 41 is a three-phase inverter that switches energization of the first winding set 11, and in which switching elements 411 to 416 are bridge-connected. One end of the U1 coil 111 is connected to a connection point of the pair of U-phase switching elements 411 and 414. One end of the V1 coil 112 is connected to a connection point of the pair of V-phase switching elements 412 and 415. One end of the W1 coil 113 is connected to a connection point of the pair of W-phase switching elements 413 and 416. Opposite ends of the coils 111 to 113 are connected to each other at a connection portion 115.

The motor driver 42 is a three-phase inverter that switches energization of the second winding set 12, and in which switching elements 421 to 426 are bridge-connected. One end of the U2 coil 121 is connected to a connection point of the pair of U-phase switching elements 421 and 424. One end of the V2 coil 122 is connected to a connection point of the pair of V-phase switching elements 422 and 425. One end of the W2 coil 123 is connected to a connection point of the pair of W-phase switching elements 423 and 426. Opposite ends of the coils 121 to 123 are connected to each other at a connection portion 125.

The switching elements 411 to 416 and 421 to 426 in the present embodiment, which are metal-oxide silicon field-effect transmitters (MOSFETs), may be constituted by other elements such as insulated gate bipolar transistors (IGBTs).

As shown in FIGS. 2 and 3, a motor relay 46 is provided between the motor driver 41 and the battery 45. A motor relay 47 is provided between the motor driver 42 and the battery 45. While a starting switch such as an ignition switch is turned on, the motor relays 46 and 47 are turned on to supply electric power to the motor 10. While the starting switch is turned off, the motor relays 46 and 47 are turned off to stop supply of electric power to the motor 10.

A voltage sensor 48 for detecting a battery voltage V is provided on the high potential side of the battery 45.

A not-shown current sensor for detecting a motor current Im is provided on each of the motor drivers 41 and 42.

As shown in FIG. 2, a transmission ECU 7 controls driving of shift hydraulic pressure control solenoids 6 based on a vehicle speed, an accelerator opening degree, a driver request shift range, or the like. The gear position is controlled by controlling the shift hydraulic pressure control solenoids 6. The number of the provided shift hydraulic pressure control solenoids 6 is determined in accordance with the number of shift positions or the like. In the drawing, the transmission EU 7 is indicated as "TCU".

The first microcomputer 51 and the second microcomputer 52 are configured to generate command signals for controlling on and off operations of the switching elements 411 to 416, 412 to 426, based on a vehicle speed, an accelerator opening degree, a driver request shift range, or the like. The driving of the motor 10 is controlled by controlling on and off of the switching elements 411 to 416, 412 to 426 according to the command signals.

In the present embodiment, when a position to stop the motor 10 is separate from a target position, the microcomputers 51 and 52 controls the motor 10 by a feedback control so as to improve responsiveness. For example, the feedback control is a speed feedback control in which a target speed Msp* is set based on a difference between an actual angle θ of the motor 10 and a target angle θ*, and the motor 10 is controlled so that the difference between the target speed Msp* and an actual speed Msp becomes zero. The actual speed Msp to be fed back may be suitably subjected to a phase advance processing, or the like.

When the actual angle θ of the motor 10 approaches the target angle θ*, the microcomputers 51 and 52 switch the feedback control to a fixed phase conduction control so as to securely stop the motor 10 at the target position.

In this way, the motor 10 can be securely stopped at the target position while enhancing the responsiveness. Therefore, the shift range can be appropriately switched.

However, the motor 10 may be controlled by any methods.

An abnormality of the first microcomputer 51 is monitored by a first monitoring IC 56.

An abnormality of the second microcomputer 52 is monitored by a second monitoring IC 57.

In the present embodiment, the microcomputers 51 and 52 are respectively and independently monitored by the corresponding monitoring ICs 56 and 57, and a mutual monitoring between the microcomputers 51 and 52 is not performed.

In the drawings, the first microcomputer 51 is indicated as "microcomputer 1", the second microcomputer 52 is indicated as "microcomputer 2", the first monitoring IC 56 is indicated as "monitoring IC 1", and the second monitoring IC 57 is indicated as "monitoring IC 2".

In the present embodiment, the shift range control device 40 is provided with two microcomputers for controlling the motor 10. Therefore, even if one of the microcomputers has an abnormality, the driving of the motor 10 can be kept to control using the other microcomputer. In a case where the microcomputers 51 and 52 are both in normal states, if the command signals for the driving of the motor 10 are output from both of the microcomputers 51 and 52, for example, there may arise a gap between output timings of the command signals, resulting in a deterioration of the efficiency of the motor 10. In the present embodiment, therefore, in a normal time, the driving of the motor 10 is controlled by one microcomputer. Hereinafter, the microcomputer used to control the driving of the motor 10 is referred to as "engaged microcomputer" and the microcomputer that is not used to control the driving of the motor 10 is referred to as "disengaged microcomputer".

Figure 4:
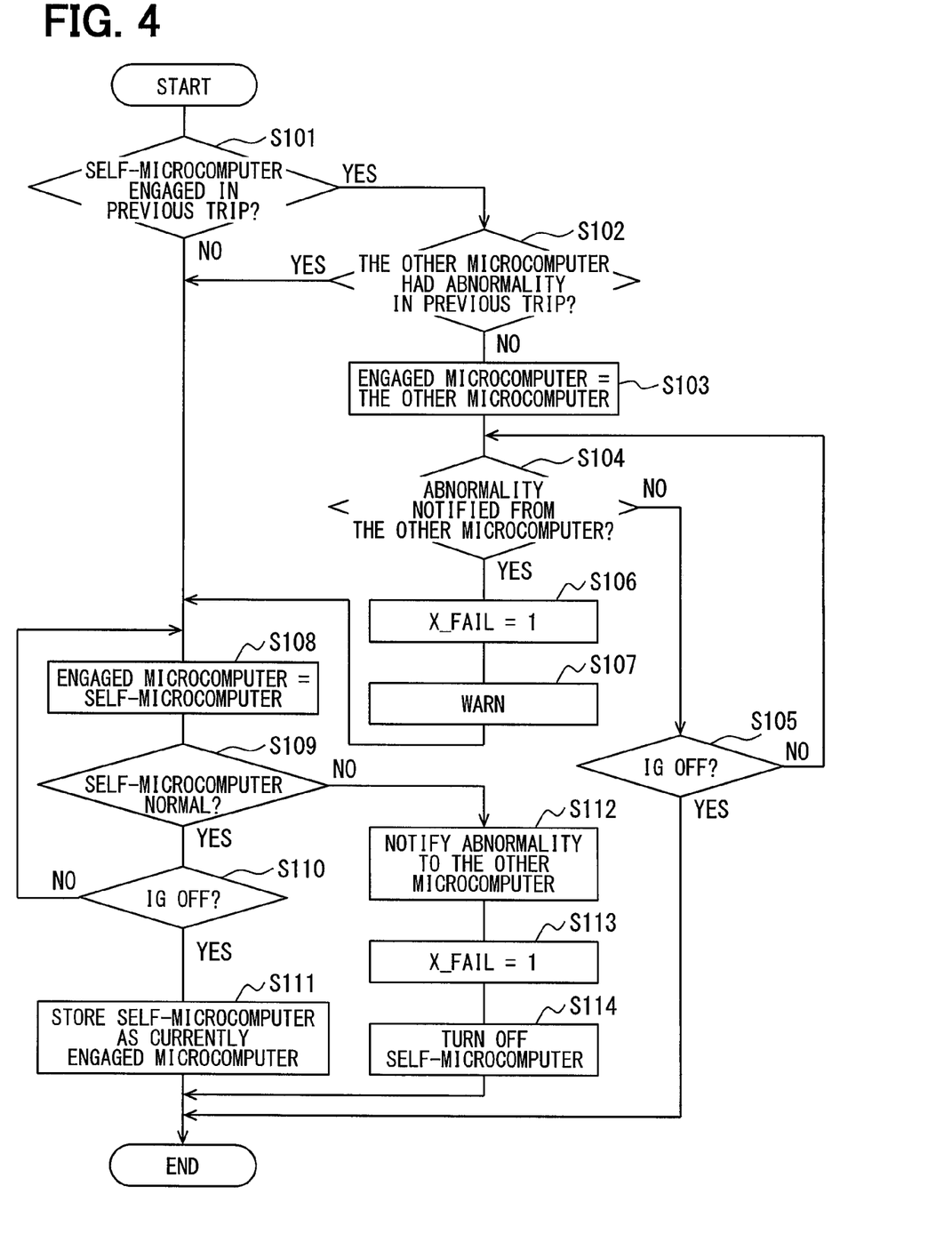
FIG. 4 is a flowchart for explaining a motor control processing according to the first embodiment.

A motor control processing according to the present embodiment will be described with a flowchart shown in FIG. 4. The motor control processing is executed while a starting switch of the vehicle is on. Note that monitoring processing by the monitoring ICs 56 and 57 are executed separately from the motor control processing. In the present embodiment, the starting switch is referred to as an ignition switch, and hereinafter appropriately indicated as "IG". In the present embodiment, a period from the time the IG is turned on to the time the IG is turned off is referred to as one trip.

In the following descriptions, it is assumed that the processing is executed by the first microcomputer 1. In this case, the first microcomputer 51 corresponds to "self-microcomputer" and the second microcomputer 52 corresponds to "the other microcomputer". In a case where the processing is executed by the second microcomputer 52, the second microcomputer 52 corresponds to the "self-microcomputer" and the first microcomputer 51 corresponds to "the other microcomputer". In such a case, since the processing is similarly executed, the description of the processing executed by the second microcomputer 52 is omitted.

Step S101 is hereinafter simply expressed as S101, using only a symbol "S" without "step". The same applies to the other steps.

In an initial S101, the first microcomputer 51 determines whether the self-microcomputer was the engaged microcomputer in a previous trip or not. When it is determined that the self-microcomputer was not the engaged microcomputer in the previous trip (S101: NO), the process proceeds to S108. When it is determined that the self-microcomputer was the engaged microcomputer in the previous step (S101: YES), the process proceeds to S102.

In S102, the first microcomputer 51 determines whether the other microcomputer had an abnormality in the previous trip. When it is determined that the other microcomputer had an abnormality in the previous trip (S102: YES), the process proceeds to S108. When it is determined that the other microcomputer had no abnormality in the previous trip (S102: NO), the process proceeds to S103.

In S103, the first microcomputer 51 sets the other microcomputer, i.e., the second microcomputer 52 to the engaged microcomputer to be used in a current trip.

In S104, the first microcomputer 51 determines whether the notification of an abnormality is received from the other microcomputer. When it is determined that the notification of the abnormality from the other microcomputer is received (S104: YES), the process proceeds to S106. When it is determined that the notification of the abnormality from the other microcomputer is not received (S104: NO), the process proceeds to S105.

In S105, the first microcomputer 51 determines whether the IG is turned off or not. When it is determined that the IG is turned off (S105: YES), the process is ended. When it is determined that the IG is not turned off (S105: NO), the process returns to S104, and is kept in a standby state of waiting for the notification of an abnormality from the other microcomputer.

In S106 executed after receiving the notification of the abnormality from the other microcomputer (S104: YES), the first microcomputer 51 sets an abnormality flag. In the drawing, the abnormality flag is indicated as "X_FAIL", and in which a state where the flag is set is indicated as "1" and a state where the flag is not set is indicated as "0". The abnormality flag is stored in a non-illustrated memory, and is kept even after the IG is turned off. When the abnormality flag is set once, it is kept and, for example, can be reset only after being repaired in a repair shop or the like.

In S107, the first microcomputer 51 turns on a warning lamp, which is provided, for example, in an instrument panel so as to warn a user of an occurrence of the abnormality in the shift-by-wire system 1. The warning method is not limited to the lighting on of the warning lamp, but the warning may be made in any other ways, such as by a speech guidance. Since the abnormality is warned, the user is encouraged to bring the vehicle to the repair shop or the like.

In S108, which is executed subsequently when the engaged microcomputer in the previous trip was the other microcomputer (S101: NO), when the other microcomputer had an abnormality in the previous trip (S102: YES), when the self-microcomputer has received the notification of the abnormality from the other microcomputer (S104: YES, S106, S107), the first microcomputer 51 sets the self-microcomputer to the engaged microcomputer, and computes a command value for the driving of the motor 10, to thereby control the motor 10 based on the command value.

In S109, the first microcomputer 51 determines whether the first microcomputer 51 is in a normal state or not. In this case, the determination is made based on a monitoring result of the first monitoring IC 56. When it is determined that the first microcomputer 51 has an abnormality (S109: NO), the process proceeds to S112. When it is determined that the first microcomputer 51 is in a normal state (S109: YES), the process proceeds to S110.

In S110, the first microcomputer 51 determines whether the IG is turned off or not. When it is determined that the IG is not turned off (S110: NO), the process proceeds to S108. Thus, the first microcomputer 51 continues the control of the driving of the motor 10 as the engaged microcomputer. When it is determined that the IG is turned off (S110: YES), the process proceeds to S111.

In S111, the first microcomputer 51 stores information indicating that the self-microcomputer is the engaged microcomputer used in the current trip in the non-illustrated memory. In this case, the information stored is kept even while the IG is off. Since the information indicating that the self-microcomputer is the engaged microcomputer used in the current trip is held, when the IG is turned on in the next time, it is possible to determine in S101 whether the self-microcomputer is the engaged microcomputer used in the previous trip. After the determination in S101, this information may be erased.

In S112, which is executed after the determination of the self-microcomputer having the abnormality (S109: NO), the first microcomputer 51 notifies the second microcomputer 52 as the other microcomputer of the first microcomputer 51 having the abnormality.

In S113, the first microcomputer 51 sets the abnormality flag.

In S114, the first microcomputer 51 turns off the self-microcomputer.

Figure 5:
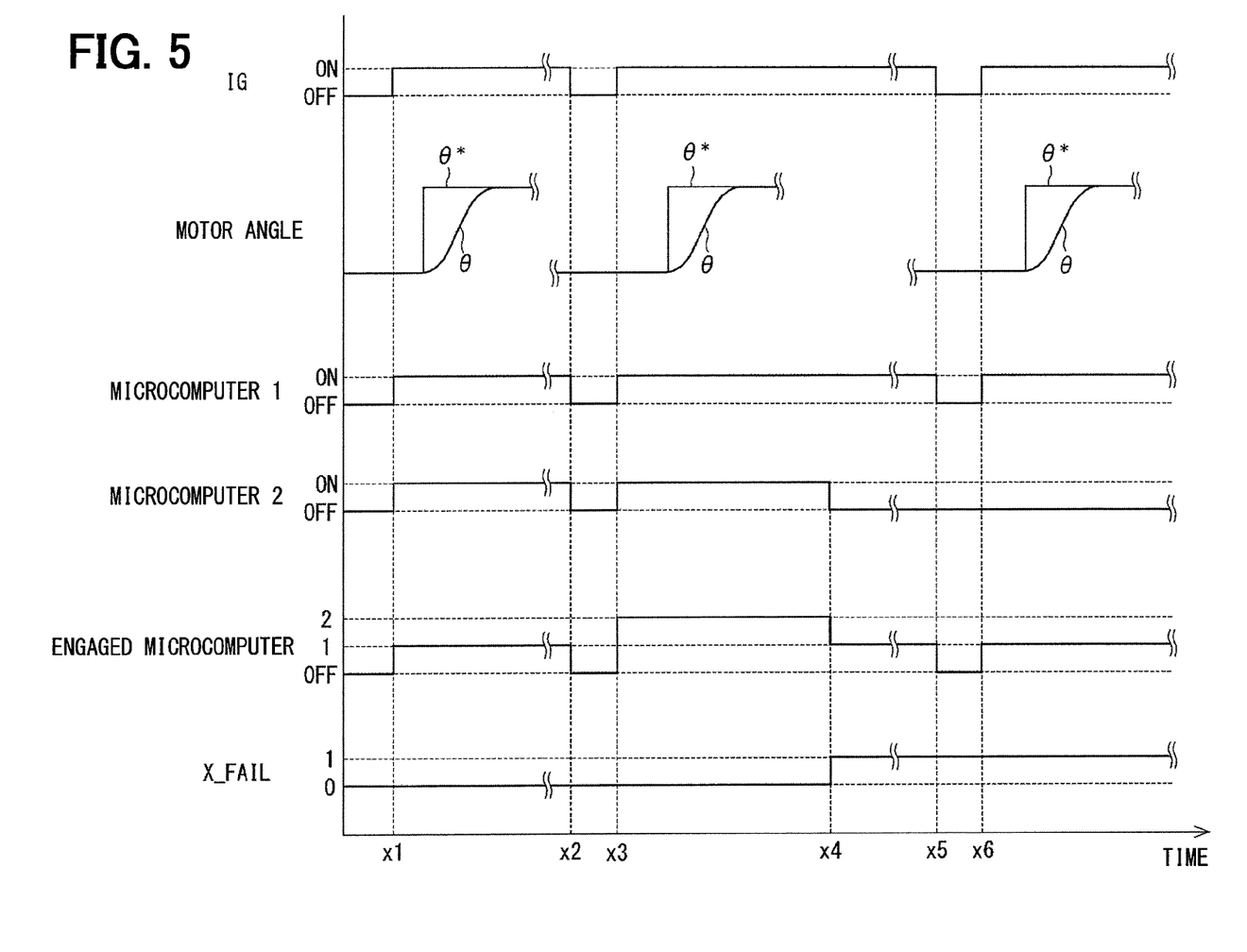
FIG. 5 is a time chart for explaining switching of a microcomputer to be used according to the first embodiment.

The switching of the engaged microcomputer of the present embodiment will be described with reference to the time chart of FIG. 5. In FIG. 5, the horizontal axis is a common time axis. The on and off states of the IG, the motor angle, the on and off states of the first microcomputer 51, the on and off states of the second microcomputer 52, the engaged microcomputer, the abnormality flag are indicated from the top in FIG. 5. Note that the time scale is suitably modified, and does not match with an actual time scale.

As shown in FIG. 5, when the IG is turned on at a time x1, the microcomputers 51 and 52 are turned on. In the trip beginning from the time x1, it is assumed that the first microcomputer 51 is the engaged microcomputer. In this case, therefore, the motor 10 is controlled based on the command value computed by the first microcomputer 51. In the present embodiment, the driving of the motor 10 is controlled such that the actual angle θ of the motor 10 coincides with the target angle θ* determined in accordance with the required shift range.

In a period from the time x1 at which the IG is turned on to a time x2 at which the IG is turned off, the first microcomputer 51 is kept as the engaged microcomputer during this trip, unless an abnormality occurs in the first microcomputer 51. Although the second microcomputer 52 is turned on when the IG is turned on, the second microcomputer 52 does not output a command value for the driving of the motor 10. However, the second microcomputer 52 may compute a command value in preparation for an occurrence of an abnormality in the first microcomputer 51, or may refrain from computing the command value until an abnormality occurs in the first microcomputer 51.

At a time x3, when the IG is turned on again, the microcomputers 51 and 52 are turned on. Since the first microcomputer 51 was the engaged microcomputer in the previous trip, the second microcomputer 52 is set to the engaged microcomputer in the current trip. Therefore, the motor 10 is controlled by the command value computed by the second microcomputer 52.

As the microcomputers 51 and 52 are engaged alternately in every trip, the reliability is ensured.

At a time x4, when an abnormality occurs in the second microcomputer 52, the abnormality flag is set, and the process proceeds to a failsafe mode. Specifically, the engaged microcomputer is switched to the first microcomputer 51, so that the motor 10 is controlled by the command value computed by the first microcomputer 51. In this way, even if an abnormality occurs in one of the microcomputers, it is possible to continue the driving of the motor 10. Therefore, it is possible to switch the shift range as in the normal time, and the evacuation travelling performance can be ensured.

Further, the second microcomputer 52 having the abnormality is turned off. Then, the occurrence of the abnormality is warned to the user.

At a time x5, the IG is turned off. At a time x6, the IG is turned on again. In the trip beginning from the time x6, although the engaged microcomputer at the end of the previous trip was the first microcomputer 51, the abnormality has occurred in the second microcomputer 52 in the previous trip. Therefore, the first microcomputer 51 is still set as the engaged microcomputer also in the current trip. That is, in the present embodiment, once the abnormality flag is set, the abnormality flag is kept, regardless of the on and off of the IG, so as to keep the failsafe mode without returning the second microcomputer 52 having the abnormality, for example, until the repair finishes. Further, also in the trip beginning from the time x6, the warning to the user is continued so as to encourage the earlier repair In the example of FIG. 5, the second microcomputer 52 corresponds to "abnormal control unit" and the first microcomputer 51 corresponds to "normal control unit".

Likewise, in a case where the first microcomputer 51 has an abnormality, the failsafe mode is kept so as not to return the first microcomputer 51, and the driving of the motor 10 is kept to be controlled by the second microcomputer 52. In this case, the first microcomputer 51 corresponds to "abnormal control unit" and the second microcomputer 52 corresponds to "normal control unit".

As described hereinabove, the shift range control device 40 of the present embodiment is configured to switch the shift range of the vehicle by controlling the driving of the motor 10. The shift range control device 40 includes the plurality of microcomputers 51 and 52, and the plurality of monitoring ICs 56 and 57. The microcomputer 51 and 52 are configured to control the driving of the motor 10. The monitoring ICs 56 and 57 are correspondingly provided for the microcomputers 51 and 52 to monitor abnormalities in the corresponding microcomputers 51 and 52. Specifically, the first monitoring IC 56 is provided for the first microcomputer 51 to monitor an abnormality in the first microcomputer 51. The second monitoring IC 57 is provided for the second microcomputer 52 to monitor an abnormality in the second microcomputer 52.

The driving of the motor 10 is controlled by one of the microcomputers 51 and 52, which is in a normal state. If an abnormality occurs in the microcomputer being used to control the driving of the motor 10, the microcomputer to be used to control the driving of the motor 10 is switched to any one of the other microcomputers. Specifically, when an abnormality occurs in the first microcomputer 51 while the first microcomputer 51 is being used to control the driving of the motor 10, the microcomputer to be used to control of the driving of the motor 10 is switched to the second microcomputer 52. Likewise, when an abnormality occurs in the second microcomputer 52 while the second microcomputer 52 is being used to control the driving of the motor 10, the microcomputer to be used to control of the driving of the motor 10 is switched to the first microcomputer 51.

In the present embodiment, since the shift range control device 40 includes the plurality of microcomputers 51 and 52, when at least one of the microcomputers 51 and 52 is in a normal state, it is possible to continue the control of the driving of the motor 10 so that the control of the switching of the shift range is continued. As such, even if an abnormality occurs in any of the microcomputers 51 and 52, it is possible to ensure the evacuation travelling performance.

If the driving of an actuator (the motor 10 in the present embodiment) is controlled using the plurality of microcomputers 51 and 52, there is a fear that the efficiency of the actuator will deteriorate due to a deviation in output timings of the commands from the respective microcomputers 51 and 52. In the present embodiment, even when the plurality of microcomputers 51 and 52 are in the normal states, one microcomputer is used to control the driving of the actuator. Therefore, the actuator can be properly controlled without deteriorating the efficiency of the actuator.

The shift range control device 40 switches the microcomputer to be used to control the driving of the motor 10 between the plurality of microcomputers 51 and 52, each time the IG of the vehicle is turned on. In this case, the reliability of the microcomputers when being switched can be ensured.

Two microcomputers 51 and 52 are used. In a case where one microcomputer 52 has an abnormality and the other microcomputer 51 is in a normal state, the driving of the motor 10 is controlled by the first microcomputer 51, which is in the normal state. When the IG is turned on again after it was turned off, the control of the driving of the motor 10 is continued by the first microcomputer 51 without returning the second microcomputer 52. In the present embodiment, in a case where an abnormality is detected once, the notification of the abnormality to the user is continued without returning the microcomputer having the abnormality. In this case, therefore, it is possible to encourage the use of an earlier repair.

Other Embodiments

In the embodiment described hereinabove, the shift range control device 40 has two control units and two monitoring units. As another embodiment, the numbers of the control units and monitoring units may be three or more. When all of the control units are in normal states, it is preferable to alternately switch the controls units so that one control unit is used in each trip, in view of ensuring the reliability.

In the embodiment described hereinabove, a time interval that begins from the time the starting switch is turned on and ends at the time the starting switch is turned off is defined as one trip, and the control unit to be used to control the driving of the actuator is switched in every one trip. As another embodiment, a time interval that begins from the time the IG is turned on and ends at the time the IG is turned off is defined as one period, and the one trip may be provided by a plurality of periods. The number of periods included in the one trip may be fixed, or varied, for example, according to a traveling distance of the vehicle or the like.

In the embodiment described hereinabove, if the control unit has an abnormality, the failsafe state is continued. The control unit having the abnormality is not returned and is not used to control the driving of the actuator. As another embodiment, when the microcomputer having the abnormality is regularly returned due to the restarting in accordance with the on and off of the starting switch, the failsafe state may be released and the microcontroller may be used to control the driving of the motor.

In the embodiment described hereinabove, the motor is constituted by a permanent magnet type three-phase brushless motor. As another embodiment, the motor may be any types of motor, such as an SR motor. In the embodiment described hereinabove, two pairs of the winding sets are included in the motor. As another embodiment, one pair or three or more pairs of the winding sets of the motor may be provided. In the embodiment described hereinabove, the actuator is constituted by the motor. As another embodiment, the actuator may be a device other than the motor.

In the embodiment described hereinabove, an encoder is used as the rotation angle sensor for detecting the rotation angle of the motor. As another embodiment, the rotation angle sensor may be of any types such as a resolver, rather than an encoder.

In the embodiment described hereinabove, the four recesses are formed in the detent plate. As another embodiment, the number of the recesses is not limited to four, but may be any number. For example, two recesses may be provided in the detent plate to allow switching between P range and not-P range. The shift range switching mechanism, the parking lock mechanism, and the like may be different from the corresponding mechanisms of the embodiment described hereinabove.

The present disclosure is not limited to the embodiments described hereinabove. The present disclosure may be implemented in various modes without departing from the gist of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device for switching a shift range of a vehicle by controlling driving of an actuator, the shift range control device comprising:
   a plurality of control units configured to control the driving of the actuator; and
   a plurality of monitoring units correspondingly provided for the plurality of control units, and configured to monitor the corresponding control units, wherein
   the driving of the actuator is controlled by one of the control units, which is in a normal state,
   when an abnormality occurs in the one of the control units being used to control the driving of the actuator, the one is switched to another one of the control units to control the driving of the actuator,
   the control unit used to control the driving of the actuator is switched in every one trip,
   the one trip is defined by a predetermined number of a period, the period being defined by a time interval that begins from a time a starting switch of the vehicle is turned on and ends at a time the starting switch is turned off, and the predetermined number of the period included in the one trip is variable according to a travelling distance of the vehicle.

2. The shift range control device according to claim 1, wherein
the one trip includes a plural number of the periods.

3. The shift range control device according to claim 1, wherein
the plurality of control units are two control units,
in a case where one of the control units has an abnormality and the other of the control units is in a normal state, the one of the control units having the abnormality is referred to as an abnormal control unit and the other of the control units being in the normal state is referred to as a normal control unit, and
when the starting switch of the vehicle is restarted after being turned off, the driving of the actuator is continued by the normal control unit without using the abnormal control unit.

4. A shift range control device configured to control driving of an actuator for switching a shift range of a vehicle, the shift range control device comprising:
a plurality of microcomputers each configured to control the driving of the actuator; and
a plurality of monitoring circuits correspondingly provided for the plurality of microcomputers, and configured to monitor the corresponding microcomputers, wherein
one of the microcomputers, which is in a normal state, is engaged to control the driving of the actuator at a time,
when an abnormality occurs in the one being engaged to control the driving of the actuator, the one is switched to another one of the microcomputers being in the normal state to keep control of the driving of the actuator,
the microcomputer used to control the driving of the actuator is switched in every one trip,
the one trip is defined by a predetermined number of a period, the period being defined by a time interval that begins from a time a starting switch of the vehicle is turned on and ends at a time the starting switch is turned off, and
the predetermined number of the period included in the one trip is variable according to a travelling distance of the vehicle.

* * * * *